United States Patent
Sawyer

(10) Patent No.: US 6,539,004 B1
(45) Date of Patent: Mar. 25, 2003

(54) TIME SYNCHRONIZATION OF PACKETIZED RADIO SIGNALS TO BASE STATIONS

(75) Inventor: Albert Joseph Sawyer, Wheaton, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/154,885

(22) Filed: Sep. 17, 1998

(51) Int. Cl.$^7$ .......................... H04Q 7/216; H04Q 7/01
(52) U.S. Cl. .................. 370/331; 370/509; 370/519; 455/502
(58) Field of Search ................. 370/441, 333, 370/337, 235, 236, 238, 239, 253, 301, 307, 235.1, 328, 331, 335, 342, 350, 316, 332, 395.4, 320, 902, 508, 509, 510, 512, 516–519, 336, 58.3, 471, 503, 473; 455/503, 438, 69, 442, 502, 439, 436, 67.6, 522, 517, 13.2, 32.1; 375/367

(56) References Cited

U.S. PATENT DOCUMENTS

| | | | | |
|---|---|---|---|---|
| 5,184,347 A | * | 2/1993 | Farwell et al. ............... | 370/335 |
| 5,268,933 A | * | 12/1993 | Averbuch ..................... | 370/331 |
| 5,586,119 A | * | 12/1996 | Scribano et al. ............. | 370/350 |
| 5,828,659 A | * | 10/1998 | Teder et al. .................. | 370/328 |
| 6,101,175 A | * | 8/2000 | Schorman et al. ........... | 370/331 |
| 6,205,125 B1 | * | 3/2001 | Proctor et al. ............... | 370/328 |
| 6,208,871 B1 | * | 3/2001 | Hall et al. .................... | 370/335 |
| 6,246,673 B1 | * | 6/2001 | Tiedemann et al. ......... | 370/333 |
| 6,253,085 B1 | * | 6/2001 | Bender ........................ | 370/331 |

FOREIGN PATENT DOCUMENTS

| | | | | |
|---|---|---|---|---|
| EP | 0522774 | | 1/1993 | ............ H04Q/7/04 |
| EP | WO 95/08899 | * | 3/1995 | ............ H04Q/7/22 |
| WO | 9607252 | | 3/1996 | ............ H04J/3/24 |

* cited by examiner

Primary Examiner—Steven Nguyen
Assistant Examiner—Phuongchau Ba Nguyen
(74) Attorney, Agent, or Firm—Werner Ulrich

(57) ABSTRACT

Methods and apparatus for transmitting packets from a source of such packets to one or more radio station sites so that the radio station sites can transmit the packets at the correct real time. Each radio site has an independent source of exact time based on the reception of signals derived from satellite inputs. Using the real time calculated by a base station, the base station calculates an offset between the time of arrival of a signal with a specified time marker, and the time that a signal with that specified time marker should have arrived in order to be transmitted in a timely fashion. The offset is sent back to the source of packets, and used by the source of packets to advance, or retard, the transmission of future packets. Advantageously, packets can be transmitted from each base station at the correct time, and if packets are being transmitted for a given call from several base stations, can be transmitted simultaneously, by these base stations.

6 Claims, 3 Drawing Sheets

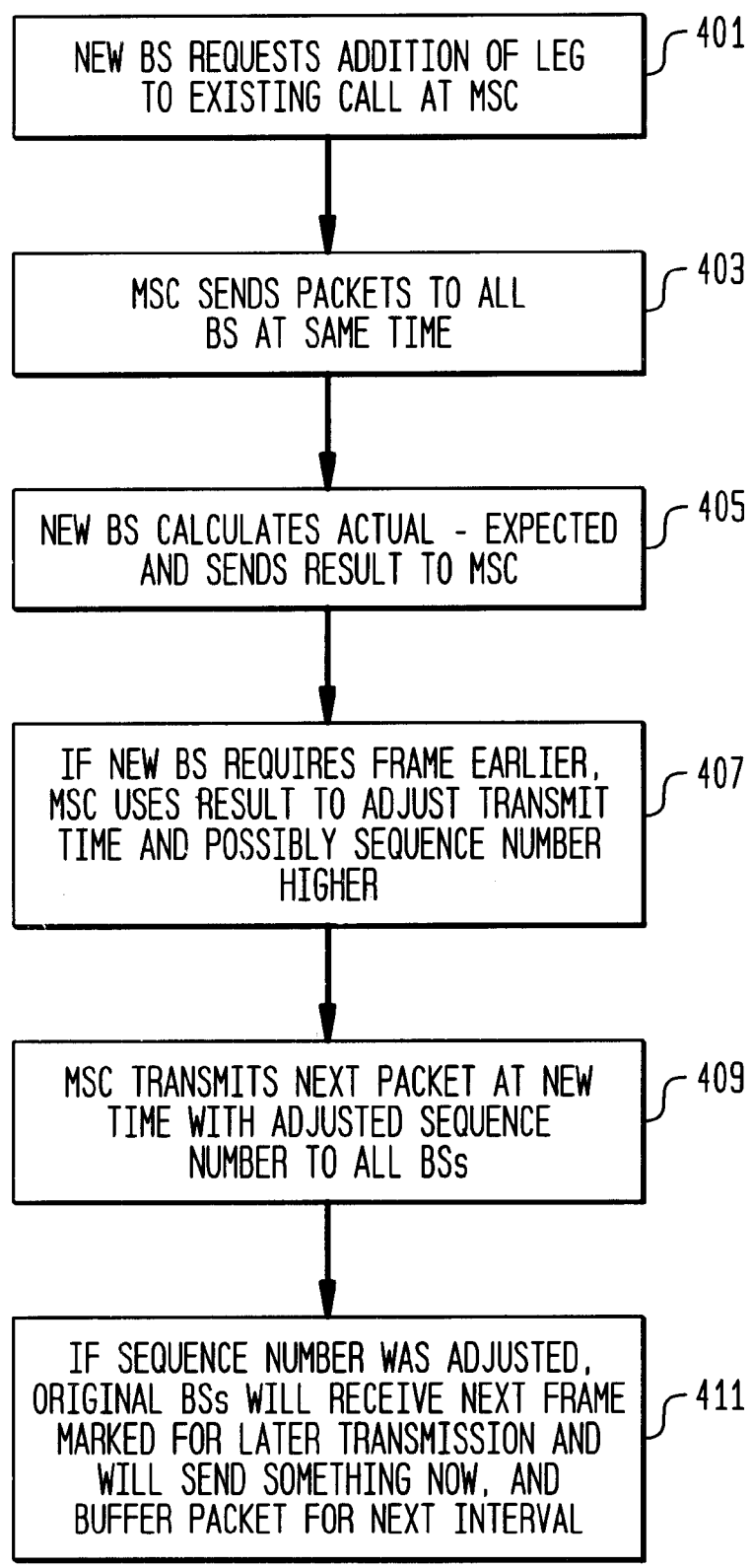

TIME SYNCHRONIZATION OF PACKETIZED RADIO SIGNALS TO BASE STATIONS

TECHNICAL FIELD

This invention relates to the synchronization of packetized radio signals transmitted from a source of packets to a radio base station.

PROBLEM

In cellular mobile communication systems, a single base station normally exchanges signals with a particular mobile station. As the mobile station moves, a different base station performs the signal transmission and reception function for the mobile when a mobile is "handed off" to another base station. This arrangement is used in analog radio transmission systems and digital systems, but is being changed where CDMA (Code Division Multiple Access) radio links are used. The characteristics of CDMA makes it possible for several base stations to transmit signals to, and receive signals from, a particular mobile station, a situation called a soft handoff; which provides a smooth transition, usually to a configuration in which only a single base station communicates with the mobile station. When the signals are received by several base stations, a frame selector unit is used to select the best signal that is received from the mobile station. If the mobile station is moving through hilly territory, or territory having many tall buildings, the strongest signal frequently moves from one base station to another. In the mobile station, provided that a digital frame is received from each of several base stations within some maximum limit, the mobile station also performs the function of selecting the strongest signal, and using that signal.

A problem arises whenever an additional base station is added to serve a call to a particular mobile station, since the latter base station must be synchronized to the other base stations already serving the call. A number of tools are available to help provide the synchronization, but these tools have not been effectively integrated into a working scheme.

The tools are the following:

1. Each base station receives an exact time from a group of satellite units used for navigational purposes. The signal from these satellites can readily be detected using the antennas of the base station.
2. The mobile switching center sends a sequence number with each frame transmitted to the base station. The frames are transmitted at 20 millisecond intervals, and arrive at the base station at substantially staggered times; the stagger in the times is greater than is tolerable by the mobile station.

SOLUTION

The above problem is solved, and an advance over the prior art is made in accordance with this invention wherein in response to receiving a packet with a particular sequence number, the base station calculates the required time of arrival for a packet with that sequence number in order that packet can be transmitted at the time specified for that sequence number by the time derived from the satellite inputs; using that calculated time, and the actual received time, base station calculates an offset, and transmits to the mobile switching center, or other source of packets, an indication of that offset; in response to receipt of the indication, the mobile switching center arranges to advance or delay the transmission of packets by the offset. If necessary, packets to other base stations may have to be delayed by one or more, 20 millisecond interval. Advantageously, using this arrangement, all the base stations will transmit the same CDMA frame essentially simultaneously, even if the time to propagate the signals from the mobile switching center to the base stations is substantially different.

BRIEF DESCRIPTION OF THE DRAWING

FIGS. 2 and 4 are flow diagrams for adjusting the offset at which the mobile switching center sends packets to the base stations.

DETAILED DESCRIPTION

Figure 1:
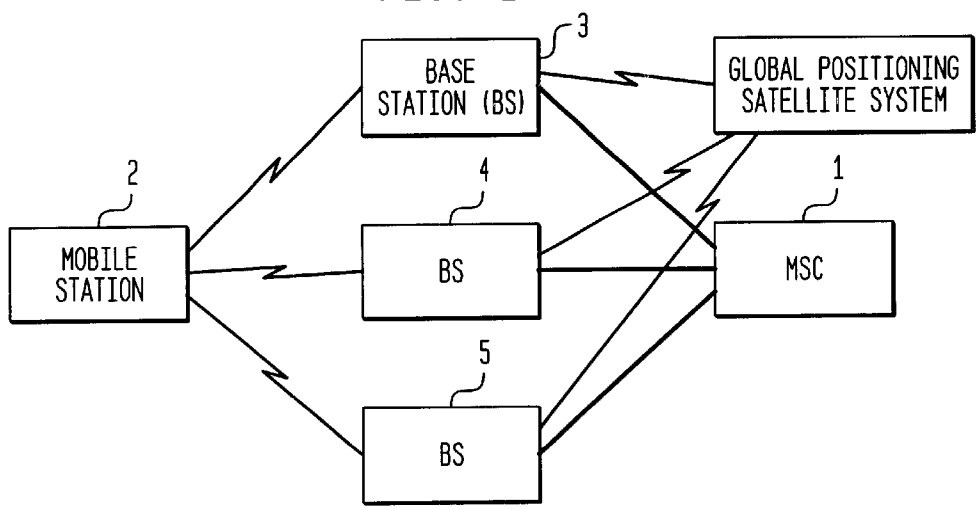
FIG. 1 illustrates a cellular system with three base stations simultaneously transmitting signals to, and receiving signals from, a particular mobile unit.

FIG. 1 is a block diagram of an illustrative cellular system using CDMA transmission between base stations 3, 4, 5, and the mobile station 2, and using packet transmission between the mobile switching center and the base station. MSC 1 is the mobile switching center controlling the call. The present standard, Interim Standard 634, Revision A (IS 634A), requires that packets be transmitted at a correct time corresponding to a packet sequence number; the sequence number is a four bit quantity which recycles every sixteen packets. This requirement makes it necessary to synchronize a mobile switching center or other source of the packets, with the base station receiving the packets when the source of the packets is distant from the radio transmitters. Further, for the case in which two or more base stations are transmitting the same packet to a mobile station, the soft handoff case, it is important that the first base station be synchronized so that subsequent added stations, which must transmit concurrently, can also be synchronized without an excessive signal interruption.

The base stations 3, 4, 5 receive timing signals from a Global Positioning Satellite System (GPS System).

Figure 2:
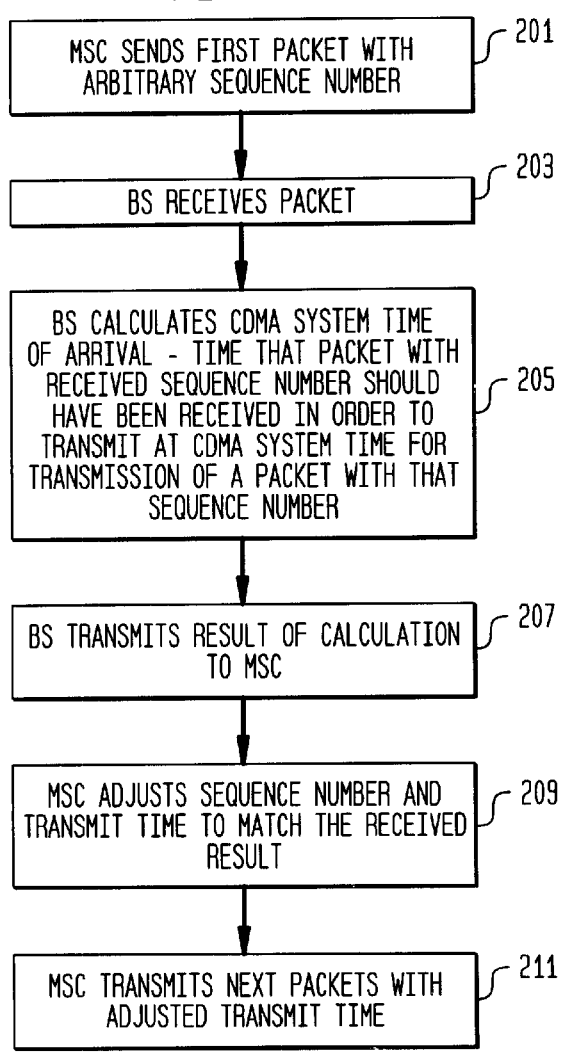

FIG. 2 shows the process of synchronizing the original additional base station. The MSC sends a packet which contains some sequence number to the base station (Action Block 201). The base station receives the packet (Action Block 203). The base station then calculates the time of arrival of that packet in terms of CDMA system time (derived from the satellite signals), and subtracts from that the time that the packet with the received sequence number should have been received in order to transmit the packet at the CDMA system time for transmission of a packet with that sequence number (Action Block 205). The base station then transmits the result of the calculation, i.e., an offset to the mobile switching center (Action Block 207). The mobile switching center adjusts the sequence number and transmit time to match the required offset (Action Block 209). The MSC then transmits the next packets with adjusted sequence numbers, at an adjusted transmit time (Action Block 211).

Figure 3:
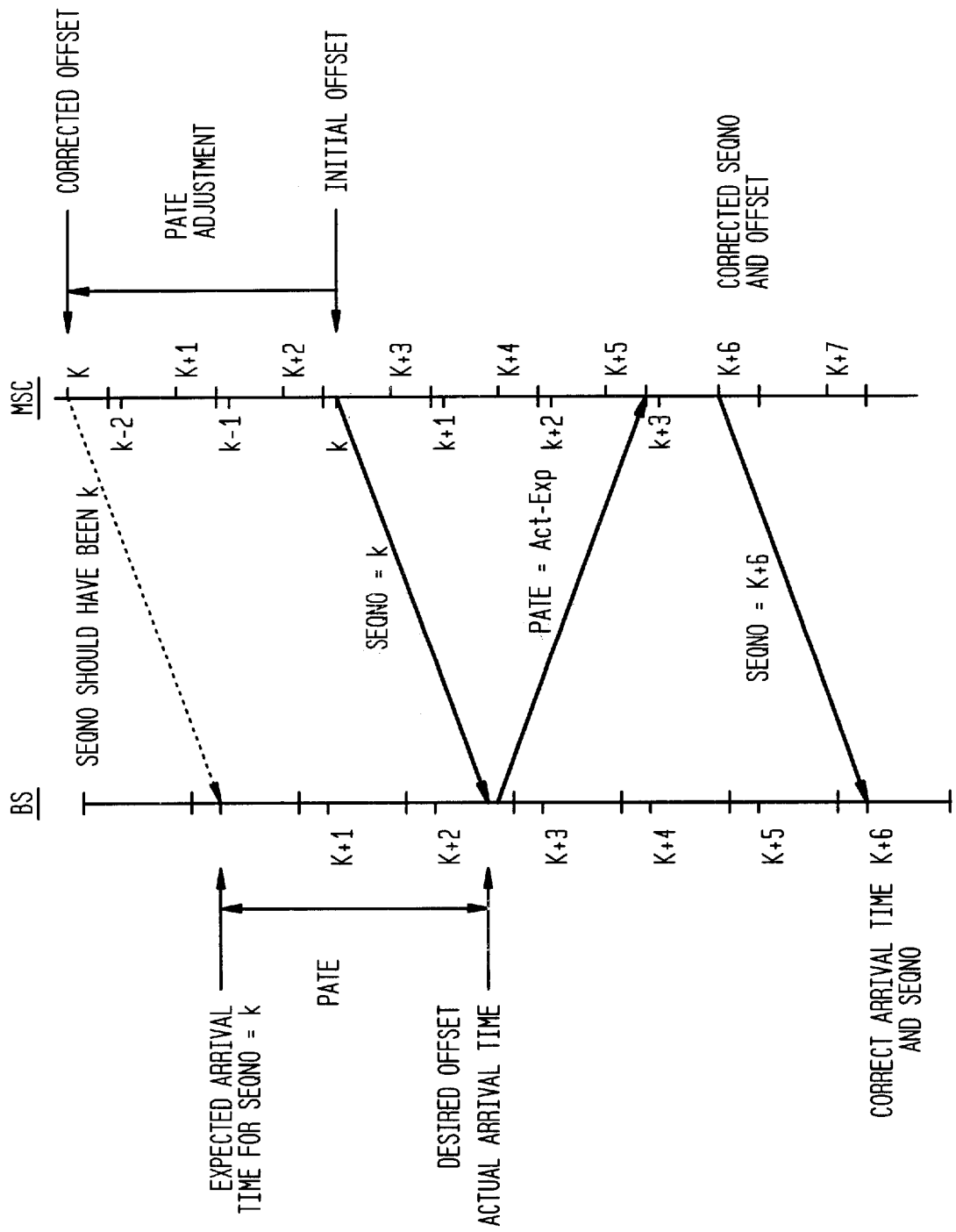
FIG. 3 is a timing diagram, illustrating the synchronization process between a base station and a source of packets.

FIG. 3 illustrates the timing problem, and the calculation of Packet Arrival Time Error, (PATE). On the left side is the time line of the base station. The wide dashes are the time ticks received in the base station from the satellite system. Each such tick is associated with a specific real time interval. On the left of the time bar for the base station are half ticks indicating the desired arrival time of each packet so that the packet can be transmitted by radio at the desired time. Thus, the left end of the dashed arrow labeled "Sequence number should have been K", terminates at the base station time line at a time such that the packet identified by the case sequence number should have been received in order that the packet can be transmitted to a mobile station at the right time.

The right vertical line represents time at the mobile switching center. The wide tick marks are the repetitive clock times at the mobile switching center. In FIG. 2, lower case sequence numbers represent packet numbers for initial, pre-synchronized packets, and upper case sequence numbers represent sequence numbers for synchronized packets. At the left of the time line, are short tick marks indicating when specific packets are being transmitted prior to synchronization. Thus, the left half tick mark identified as "k", indicates the time when an initial packet with sequence number "k" was transmitted to the base station.

The short ticks marks to the right of the time line indicate the corrected offset arrived at after making a PATE adjustment. With the corrected offset, the MSC sends each packet at a time such that the base station receives that packet at the correct time. In the specific example, the MSC sends a packet with sequence number k at a time between the desired time of arrival of the K+2, and the desired time of arrival of the K+3 packet. The base station calculates an offset between the actual time of arrival of the packet with sequence number "k", and the desired, or expected time of arrival time for packet with sequence number K. The difference is the PATE. The base station then transmits the value of PATE back to the MSC, and the MSC adjusts its offset by the PATE adjustment. Having made this offset adjustment so that the MSC instead of transmitting packets according to the half tick marks of the left side of the time line of the MSC, sends the packets in accordance with the half tick marks on the right side of the time line. As a result, the MSC sends the packet with the K+6 sequence number to the base station at the correct arrival time as illustrated by the bottom arrow connecting the MSC and the base station time line.

FIG. 4 illustrates the process of adding a leg to a call. This is the process that is required in order to carry out a so-called handoff, i.e., a handoff during which the mobile is receiving signals from 2 or more base stations. The new base station requests the addition of a leg to an existing call at the MSC (Action Block 401). In accordance with the preferred embodiment, the MSC sends packets to all base stations at the same time (Action Block 403). The new base station calculates the actual minus expected time, and sends the result to the MSC (Action Block 405). If the new base station requires a frame earlier, the MSC uses the result to adjust the transmit time, and possibly the sequence number higher (Action Block 407). The MSC transmits the next packet at the new time with the adjusted sequence number to all base stations (Action Block 409). If the sequence number was adjusted, then the original base stations will receive the next frame marked for later transmission, and will send something now and buffer the packet for the next interval (Action Block 411).

Multiple leg soft handoffs are provided for in the standards for code division multiple access (CDMA) radio systems. The arrangement described herein is applicable to other packetized radio systems that use a standard similar to the IS 634A in that there is a requirement that the source of the packet is distant from the radio transmitter, and specifies the over-the-air transmission time of a packet. Synchronization among different base stations is only required when a soft handoff is supported by the digital radio technology.

The above description is of only one preferred embodiment of Applicant's invention. Many other arrangements can be derived by those of ordinary skill in the art without departing from the scope of the invention. The invention is thus limited only by the attached Claims.

What is claimed is:

1. A method of adjusting the timing of frames for transmission to a radio transmitter site of a cellular wireless communications system, comprising the steps of:

said radio transmitter site receiving signals representing an accurate source of time;

from said signals representing an accurate source of time, deriving timing for a periodic multi-frame timing signal having an indication of the beginning of each frame of the multi-frame signal, and a sequence number within said mutli-frame sequence representing an identity of said each frame within the periodic multi-frame timing signal;

transmitting from a source of a periodic sequence of frames, a first frame with a sequence number and a transmit time for said first frame in said periodic sequence;

at said radio transmitter site, calculating a frame offset and a time offset between an actual time of reception of said first frame and a desired time of reception for a frame having a sequence number received with said first frame;

transmitting said frame offset and said time offset to said source of frames;

at said source of frames, adjusting a sequence number within a multi-frame sequence and a time of transmittal from said source of frames to conform to said frame and said time offset;

whereby subsequent frames are transmitted from said source at a time such that they are received at said radio transmitter site at a desired time of arrival for a specified time of transmission.

2. The method of claim 1, wherein said signals representing an accurate source of time are received from a Global Positioning Satellite System.

3. The method of claim 1, further comprising the steps of:

recognizing a need to add an additional transmitter site for transmitting said frames;

transmitting a second frame with a sequence number of a second transmit time for said second frame to said additional transmitter site;

at said additional transmitter site, calculating a second frame offset and a second tm offset between an actual time of reception of said second frame, and a desired time of reception for a second frame having a second sequence number received with said second frame;

transmitting said second frame offset and said second time offset to said source of frames;

computing a candidate new sequence number of a specified transmit time, and a new time offset for transmittal from said source of frames to conform to said second frame offset and said second time offset;

comparing said candidate new sequence number with said indicator; and selecting whichever of said sequence number, and said candidate new sequence number will deliver frames on time to the radio transmitter site which requires earliest transmission to arrive at that radio transmitter site.

4. Apparatus adjusting the timing of packets for transmission to a radio transmitter site of a cellular wireless communication system, comprising:

at said radio transmitter site, means for receiving signals representing an accurate source of time;

from said signals representing an accurate source of time, means for deriving timing for a periodic multi-frame timing signal having an indication of the beginning of each frame of the multi-frame signal, and a sequence number within said multi-frame sequence representing an identity of said each frame within the periodic multi-frame timing signal;

means for transmitting from a source of a periodic sequence of frames, a first frame with a sequence number and a transmit time for said first frame in said periodic sequence;

at said radio transmitter site, means for calculating a frame offset and a time offset between an actual time of reception of said first frame and a desired time of reception for a frame having a sequence number received with said first frame;

means for transmitting said frame offset and said time offset to said source of frames;

at said source of frames, means for adjusting a sequence number within a multi-frame sequence, and a time of transmittal from said source of frames to conform to said frame and said time offset;

whereby subsequent frames are transmitted from said source at a time such that they are received at said radio transmitter site at a desired time of arrival for a specified time of transmission.

5. The apparatus of claim 4, wherein said signals representing an accurate source of time are received from a Global Positioning Satellite System.

6. The apparatus of claim 4, further comprising:

means for recognizing a need to add an additional transmitter site for transmitting said frames;

means for transmitting a second frame with a sequence number of a second transmit time for said second frame to said additional transmitter site;

at said additional transmitter site, means for calculating a second frame offset and a second time offset between an actual time of reception of said second frame, and a desired time of reception for a second frame having a second sequence number received with said second frame;

means for transmitting said second frame offset and said second time offset to said source of frames;

means for computing a candidate new sequence number of a specified transmit time, and a new time offset for transmittal from said source of frames to conform to said second frame offset and said second time offset;

means for comparing said candidate new sequence number with said indicator; and means for selecting whichever of said sequence number, and said candidate new sequence number will deliver frames on time to the radio transmitter site which requires earliest transmission to arrive at that radio transmitter site.

* * * * *